(12) United States Patent
Nishiguchi et al.

(10) Patent No.: US 10,274,385 B2
(45) Date of Patent: Apr. 30, 2019

(54) APPARATUS FOR DETECTING TORQUE VALUE

(71) Applicants: SOKEN, INC., Nishio, Aichi-pref. (JP); DENSO CORPORATION, Kariya, Aichi-pref. (JP)

(72) Inventors: Yoshitaka Nishiguchi, Nishio (JP); Ken Tanaka, Nishio (JP); Shigetoshi Fukaya, Kariya (JP); Toshiro Suzuki, Kariya (JP); Satoru Jinno, Kariya (JP)

(73) Assignees: SOKEN, INC., Nishio, Aichi-pref. (JP); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/845,383

(22) Filed: Dec. 18, 2017

(65) Prior Publication Data

US 2018/0180497 A1   Jun. 28, 2018

(30) Foreign Application Priority Data

Dec. 22, 2016   (JP) .................................. 2016-249510

(51) Int. Cl.
    *G01L 3/10*     (2006.01)
    *G01D 15/12*    (2006.01)
    *G01D 3/028*    (2006.01)
    *B62D 6/10*     (2006.01)

(52) U.S. Cl.
    CPC ............... *G01L 3/101* (2013.01); *B62D 6/10* (2013.01); *G01D 3/028* (2013.01); *G01D 15/12* (2013.01)

(58) Field of Classification Search
    CPC .......... G01L 3/101; B62D 6/10; G01D 3/028; G01D 15/12
    USPC ........................ 73/862.331–862.338, 862.325
    See application file for complete search history.

(56) References Cited

U.S. PATENT DOCUMENTS

| 7,089,809 | B2 * | 8/2006 | Nakane ..................... | B62D 6/10 |
| | | | | 73/862.331 |
| 8,776,619 | B2 * | 7/2014 | Jammer .................. | G01L 3/104 |
| | | | | 73/862.333 |
| 8,984,964 | B2 * | 3/2015 | Lee ......................... | G01L 3/101 |
| | | | | 73/862.193 |
| 10,132,702 | B2 * | 11/2018 | Nishiguchi et al. | |

FOREIGN PATENT DOCUMENTS

JP        2011-089890        5/2011

* cited by examiner

*Primary Examiner* — Jonathan M Dunlap
*Assistant Examiner* — Octavia Hollington
(74) *Attorney, Agent, or Firm* — Knobbe, Martens, Olson & Bear, LLP (57) ABSTRACT

A torque detecting apparatus includes a first shaft; a second shaft; an elastic member coaxially linking the first and second shafts; and a magnet attached to the first shaft; a pair of magnetic yokes composed of a first magnetic yoke and a second magnetic yoke, the first and second magnetic yokes being fixedly installed on the second shaft; and a magnetic sensor. Each magnetic yoke includes an opposing portion and a wall portion. The opposing portion is opposed to the magnet and displaced circumferentially relatively to the magnet when the elastic member is subjected to a torsional displacement. The wall portions of the first and second magnetic yokes are separated and positioned outside the opposing portions in the radial direction. The wall portions of the first and second magnetic yokes extend to be mutually opposed. The magnetic sensor is positioned between the wall portions.

11 Claims, 7 Drawing Sheets

APPARATUS FOR DETECTING TORQUE VALUE

CROSS-REFERENCE TO RELATED APPLICATION

This application is based on and claims the benefit of priority from earlier Japanese Patent Application No. 2016-249510 filed Dec. 22, 2016, the description of which is incorporated herein by reference.

BACKGROUND

Technical Field

The present invention relates to an apparatus for detecting a value of torque, and in particular, to an apparatus for detecting a value of torsional torque.

Related Art

It has been known that a torque detecting device (i.e., a torque sensor) is used by devices such as electric power steering devices in order to detect a torsional torque caused in a shaft. For example, this is exemplified by a patent publication JPA 2011-89890 A.

In the structure provided by this publication, there are provided a torsion bar mutually linking an input shaft and an output shaft and a pair of yokes opposed to a multipolar magnet. When the torsion bar is twisted, the pair of yokes is displaced relatively to the multipolar magnet in the circumferential direction thereof. There is also a magnetic sensor in this known structure, which allows the magnetic sensor to detect a density of magnetic flux generated between the yokes. The magnetic sensor is able to detect a value of torsional torque based on changes in the magnetic flux density.

The torque sensor provided by the patent publication JPA 2011-89890 A is also provided with a magnetic shield around the magnetic sensor in order to shield against magnetic noise. By this shielding structure, magnetic noise directly coming to the magnetic sensor from outside the magnetic sensor is suppressed, which is effective for improving detection accuracy of the magnetic flux.

However, with the shielding structure disclosed by the foregoing publication, there are still drawbacks in relation to its complex structure and production. That is, since the magnetic shield is necessary to reduce influence of magnetic noise coming from the outside, the structure of the torque sensor becomes complex and the number of assembling steps increases.

SUMMARY

With consideration of the foregoing drawbacks, it is thus desired to provide a torque detecting apparatus which is simpler in its structure and still capable of reducing magnetic noise coming from the outside the apparatus With consideration of the foregoing situation, an exemplary embodiment provides an apparatus for detecting torque (i.e., a torque detecting apparatus) comprising: a first shaft; a second shaft; an elastic member coaxially linking the first and second shafts such that the first and second shafts are linked linearly with the elastic member therebetween and the elastic member provides a torsional displacement for detecting the torque. In this structure composed of the linearly connected first and second shafts and elastic member provides an axial direction along a length-wise direction of the first and second shafts, a radial direction perpendicular to the axial direction, and a circumferential direction around the first and second shafts.

The apparatus further comprises a magnet attached to the first shaft; a pair of magnetic yokes composed of a first magnetic yoke and a second magnetic yoke, the first and second magnetic yokes being fixedly installed on the second shaft, the first and second magnetic yokes being separated from each other in the axial direction; and a magnetic sensor detecting magnetic flux generated between the first and second magnetic yokes. Each of the first and second magnetic yokes comprises an opposing portion, the opposing portions being positioned to be opposed to the magnet and displaced relatively to the magnet in the circumferential direction when the elastic member is subjected to a torsional displacement; and a wall portion, the wall portions of the first and second magnetic yokes being separated in the radial direction and positioned outside the opposing portions in the radial direction, the wall portion of each of the first and second magnetic yokes extending towards the wall portion of the other of the first and second magnetic yokes, the magnetic sensor being positioned between the wall portions of the first and second magnetic yokes.

In the foregoing apparatus configuration, the wall portions of the magnetic yokes (i.e., the first and second magnetic yokes) prevents magnetic noise from impinging onto the magnetic sensor from outside the apparatus, thus preventing or suppressing influence of such noise to the magnetic sensor. In addition, of the first and second magnetic yokes, the wall of one of such yokes extends toward the other. This extending configuration strengthens prevention of such external noise, while still maintaining a simpler structure of the noise prevention.

DETAILED DESCRIPTIONS OF VARIOUS EMBODIMENTS

With reference to the accompanying drawings, various embodiments of an apparatus for detecting torque according to the present invention will now be described. Components which have the same or similar in their structures or functions as or to ones throughout the following embodiments will be given the same reference numbers for the sake of a simplified explanation.

First Embodiment

Referring to FIGS. 1 to 4, an apparatus for detecting torque according to a first embodiment will now be described.

Figure 1:
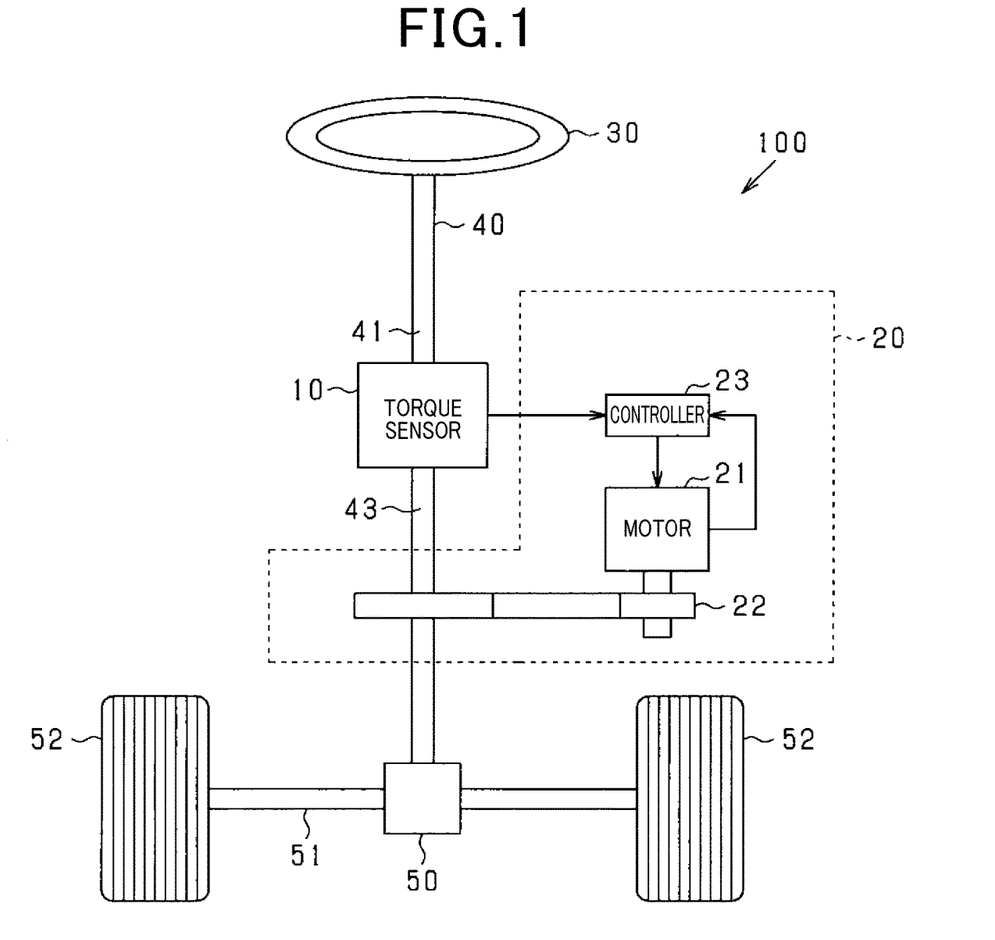
FIG. 1 is a schematic diagram outlining a steering system according to an embodiment of the present invention.

FIG. 1 shows an apparatus 10 for detecting torque generated in an eclectic power steering apparatus. The apparatus 10 for detecting the torque will now be simply referred to as a torque detecting apparatus.

As illustrated as an example in FIG. 1, the torque detecting apparatus 10 is provided in the steering system 100 of a vehicle, in which an electric power steering apparatus 20 is also provided in the steering system in order to assist driver's steering operations.

Figure 2:
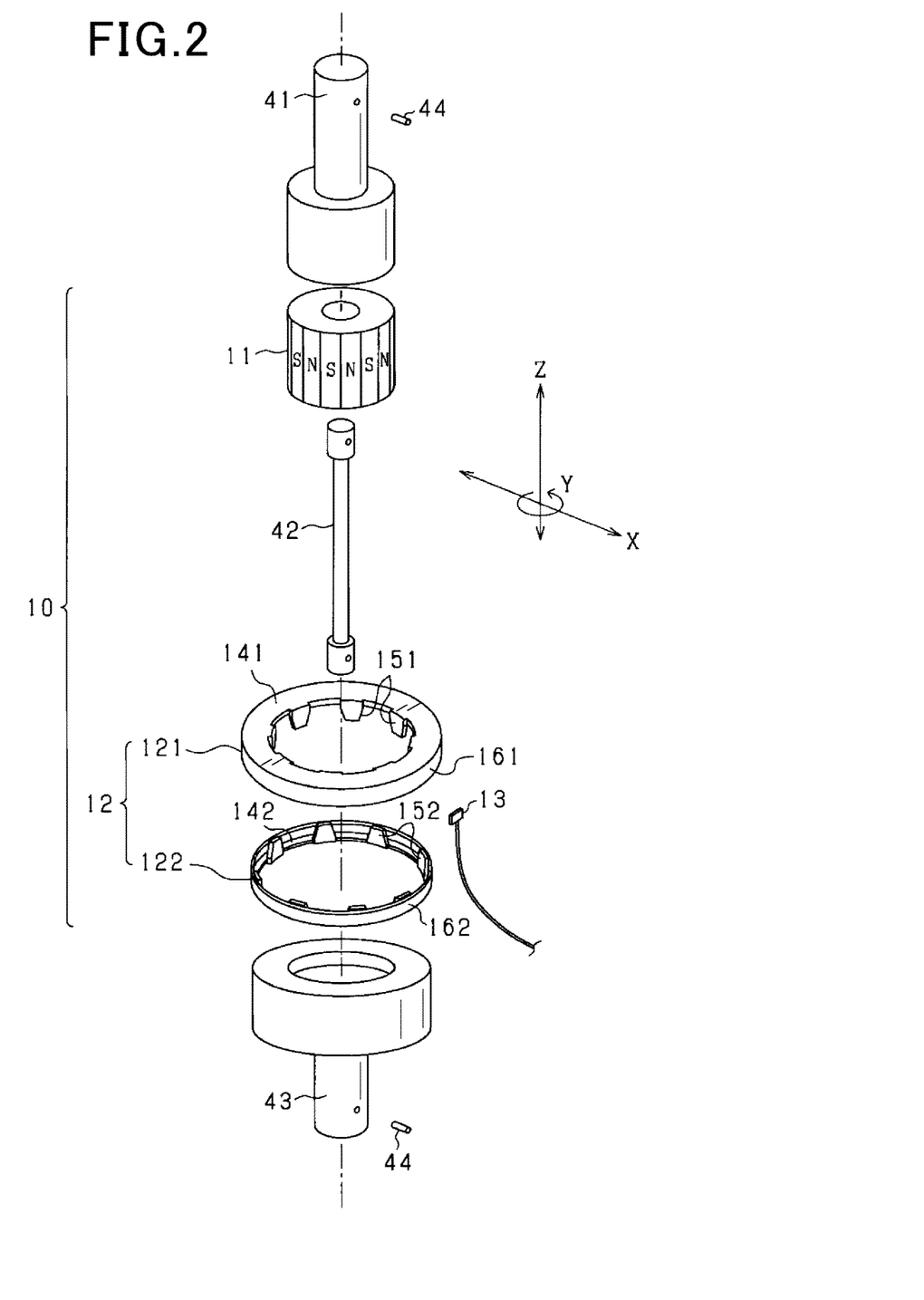
FIG. 2 is a disassembled perspective view of a torque detecting apparatus mounted in the steering system.

A steering wheel 30 is linked with a steering shaft 40. As shown in FIG. 2, the steering shaft 40 is equipped with an input shaft 41, which serves as a first shaft, which is connected with the steering wheel 30, a torsion bar 42 linked with the input shaft, and an output shaft 43, which serves as a second shaft, which is linked with the input shaft via the torsion bar 42.

The torsion bar 42 has two ends along thereof, one of which is fixed to the input shaft 41 by a fixing pin 44 and the other of which is fixed to the output shaft 43 by another fixing pin 44, respectively, such that both the input and output shafts 41 and 43 are linked coaxially in their axial directions of both the shafts. The torsion bar 42 is a rod-shaped elastic member, so that, depending on torsional torque applied to the steering shaft 40, the torsion bar 42 twists, as a torsional displacement, and stores an elastic force therein. As shown in FIG. 1, the torque detecting apparatus 10 is provided between the input and output shafts 41 and 43, thereby enabling the torque detecting apparatus 10 to detect the torque applied to the torsion bar 42 (i.e., the steering shaft 40).

The output shaft 43 has an end at which a pinion bear 50 is arranged, and the pinion gear 50 is configured to engage with a rack shaft 51. The rack shaft 51 has both ends each of which is coupled with a wheel 52 on the right and left sides of the vehicle, with using tie rods or necessary members. When a driver turns the steering wheel 30, the steering shaft 40 connected with the steering wheel 30 is turned, thus making the rack shaft 51 move linearly in the right and left direction due to operations of the pinion gear 50. As a result, according to an amount of displacement generated in the rack shaft 51, the wheels 52 are steered.

The electric power steering apparatus 20 is an electric motor 21, a reduction gear 22, a controller 23, and other necessary components. The electric motor 21 is configured to provide assist torque to assist steering operations of the steering wheel 30 turned by the driver. The reduction gear 22 is configured to reduce the number of rotations of the motor 21 to provide the decelerated rotation to the steering shaft 40. The steering assist system which can be employed in the present embodiment will not be limited to the column assist type system as described above, but other types of assisting system can be employed. Such other types of assisting system include a pinion assist type of system in which the rotation of the motor 21 is transmitted to the pinion gear 50 and a rack assist type of system in which the rotation of the motor 21 is transmitted to the rack shaft 51.

The controller 23 is provided with a computer, such as a CPU, and an electronic driver, which receives a voltage signal indicative of a quantity of torsional torque, which comes from the torque detecting apparatus 10, and controls of drive the motor 21 depending on the received voltage signal.

By the way, the three-directional directions can be defined in the present and succeeding embodiments, which are as follows. As shown in FIG. 2, an axial direction Z refers to directions along a length-wise direction of the steering shaft 40 (which is true of that of the input and output shafts 41 and 43 and the torsion bar 42). A radial direction X refers to directions extending radially in a section of the steering shaft 40. In addition, a circumferential direction Y refers to directions circumferentially extending around the steering shaft 40.

As shown in FIG. 2, the torque detecting apparatus 10 is provided with a magnet 11 fixed to the input shaft 41, a single pair of magnetic yokes 12 fixed to the output shaft 43, a magnetic sensor 13 and other necessary components. The magnetic sensor 13 is configured to detect a density of magnetic flux generated between the paired magnetic yokes 12.

The magnet 11 is composed of hard magnetic materials and is formed into a cylindrical shape. The magnet 11 is fixed coaxially to the input shaft 41 in the axial direction Z. The hard magnetic materials are magnetized to N and S magnetic poles, in which such N and S magnetic poles are arranged alternatively in the circumferential direction Y. in the present embodiment, the number of each of the N and S magnetic poles is 8, thereby totaling 16 magnetic poles. The number of magnetic poles of the magnet 11 is not limited to 16, but may be any other even number.

The single pair of magnetic yokes 12 are arranged separately, yoke by yoke, from each other in the axial direction Z. By resin-molding the paired magnetic yokes 12 or providing the paired magnetic yokes 12 with spacers, the separate and fixed arrangement of the magnetic yokes 12 is realized. In the embodiment, the magnetic yokes 12 is composed of first and second magnetic yokes 121 and 122, in which the first magnetic yoke 121 is located adjacently to the input shaft 41 and a second magnetic yoke 122 adjacently to the output shaft 43. The first and second magnetic yokes 121 and 122, which are made of soft magnetic material, are both shaped into annular bodies, and fixed to the output shaft 43 on the radially outer side of the magnet 11.

Practically, the first magnetic yoke 121 has a cylindrical annular body 141, in addition to claw portions 151 (which serve as opposing portions) and wall portions 161. The claw portions 151 are provided to extend in the axial direction Z, while the wall portions 161 are arranged to be outside the claw portions 151 in the radial direction X. Similarly to the first magnetic yoke 121, the second magnetic yoke 122 has a cylindrical annular body 142, in addition to claw portions 152 (which serve as opposing portions) and wall portions 161. The claw portions 151 are provided to extend in the axial direction Z, while the wall portions 162 are arranged to be outside the claw portions 151 in the radial direction X.

The claw portions 151 and 152 (which serves as the opposing portions) has the same number as the number of magnetic pole pairs of the magnets 11 (in the present embodiment, the number is eight). The claw portions 151 and 152 are located along inner edges of the annular bodies 141 and 142, respectively, at an equal distance pitch. Specifically, a plurality of the claw portions 151 and a plurality of the claw portions 152 are arranged in accordance with every pitch of the magnetic poles composing the magnet 11. The first magnetic yoke 121 has the claw portions 151 and the second magnetic yoke 122 has the claw portions 152, in which both types of claw portions 151 and 152 are shifted alternately, from each other, in the circumferential direction of the annular bodies. Alternatively, the claw portions 151 and 152 can be made different in number from the number of magnetic poles of the magnet 11.

Figure 3A:
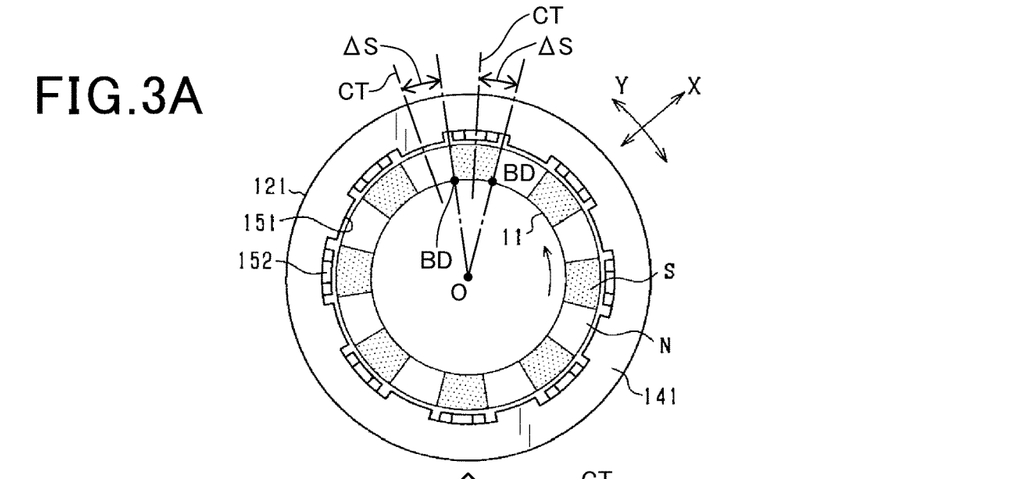
FIGS. 3A, 3B and 3C are plan views of the torque detecting apparatus.
Figure 3B:
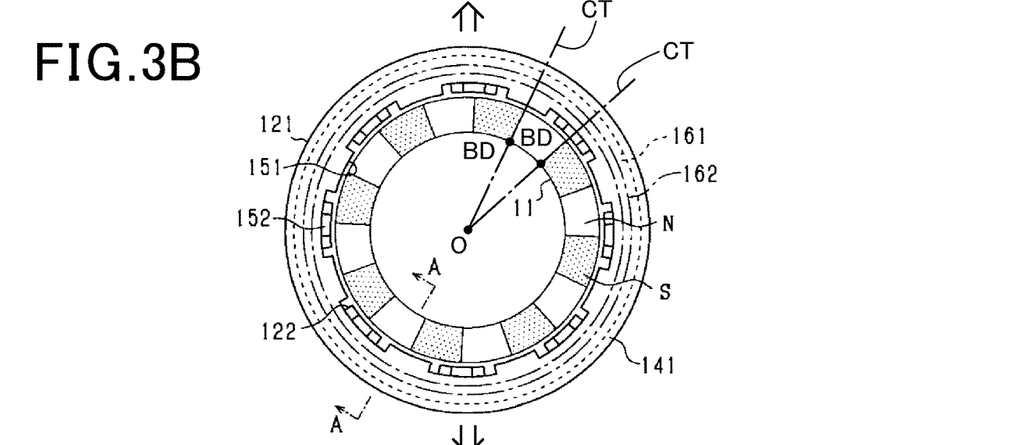

More specifically, the claw portions 151 and 152 are arranged to be opposed to the outer surface of the magnet 11. As shown in FIG. 3B, when the torsion bar 42 is not subjected to a torsional displacement thereof, the circumferential center of each of the claw portions 151 and the circumferential center of each of the claw portions 152 are set to positionally agree with a border position between mutually-adjacent N and S magnetic poles of the magnet 11 in the circumferential direction Y. The magnet 11 and the magnetic yokes 12 are separated (i.e., non contacted) from each other.

In a space provided between the first and second magnetic yokes 121 and 122, one or more magnetic sensors 13 are arranged. The magnetic sensor 13 is configured to detect magnetic flux passing the space, generate a voltage signal depending on a density of the passing magnetic flux to a voltage signal, and output the generated voltage signal. For example, a Hall element or a magnetoresistive element can be adopted as the magnetic sensor 13.

How the magnetic sensor 13 detects a torsional toque will now be described.

At first, a description is made about a case where a torsional torque is not applied between the input and output shafts 41 and 43, that is, the torsion bar 42 is not twisted and located at it neutral position. As shown in FIG. 3B, at this neutral position, the circumferential centers CT of the respective claw portions 151 and 152 positionally agree with the borders BD of mutually-adjacent N and S magnetic poles of the magnet 11, respectively, in the circumferential direction Y. In this neutral position, when focusing on a pair of the single claw portion 151 and the single claw portion 152 which are mutually adjacent in the circumferential direction Y, the same number of magnetic lines generated from the N and S magnetic poles are made to pass through both the mutually-adjacent claw portions 151 and 152. Hence, within each of the first and second magnetic yokes 121 and 122, the magnetic lines are closed to make a loop. This does not allow the magnetic flux to leak into the space provided between the first and second magnetic yokes 121 and 122, which results in that a magnetic flux density detected by the magnetic sensor 13 becomes zero.

Figure 3C:
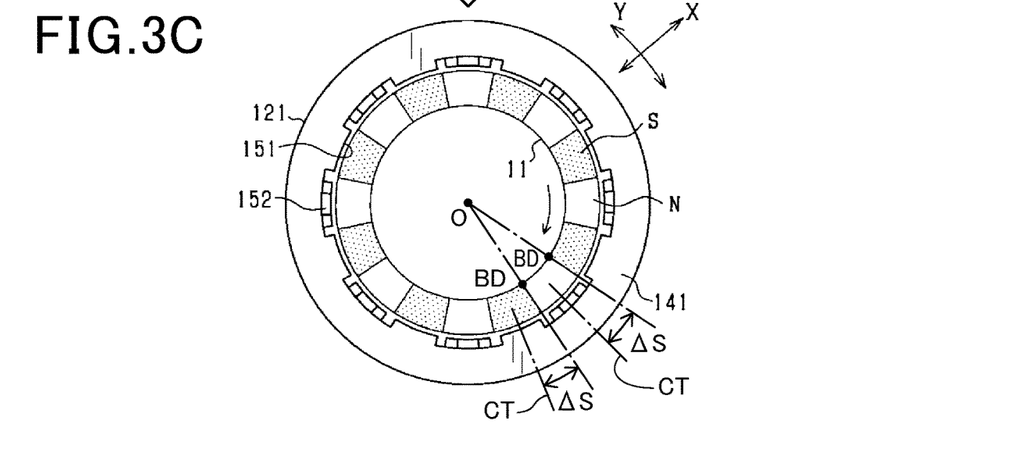

When the steering wheel is turned, a torsional torque is applied between the input and output shafts 41 and 43 to cause a torsional displacement at the torsion bar 42. This will cause a displacement relatively between the magnet 11 and the pair of magnetic yokes 12 in the circumferential direction Y. Therefore, as shown in FIGS. 3A and 3C, the circumferential centers of the claw portions 151 and 152 and the borders of the N and S magnetic poles of the magnet 11 are shifted from each other in the circumferential direction Y (refer to a shift ΔS shown in FIGS. 3A and 3C), resulting in that magnetic lines of the N or S magnetic pole will increase or decrease, corresponding to every magnet element, in the magnetic yokes 12.

In this case, in the first and second magnetic yokes 121 an 122, magnetic lines (magnetic flux) having mutually-opposite magnetic poles are increased, thus generating a magnetic density corresponding to the increased magenta lines between the first and second magnetic yokes 121 an 122.

The magnetic density detected by the magnetic sensor 13 is approximately proportional to the torsional displacement amount of the torsion bar 42 and the polarity of the detected magnetic density inverts depending on a twisting direction of the torsion bar 42. The magnetic sensor 13 is therefore able to sense this magnetic density and output the sensed magnetic density in the form of an electric voltage signal. The amplitude of the voltage signal, i.e., a voltage, is approximately proportional to the sensed magnetic density, i.e., the torsional displacement amount. Since the torsional torque is proportional to the torsional displacement amount, the outputted voltage signal is also proportional to the torsional torque. In this way, the torque detecting apparatus 10 is able to output the voltage signal in accordance with an amount of the torsional torque.

By the way, it is general that a magnetic sensor employed into a torque detecting apparatus may be influenced by external magnetic noise. Such noise is, for example, noise generated due to on and off switching operations of electronic devices mounted on a vehicle, noise generated by high-voltage transmission lines, and noise generated from the road or surrounding roads. To suppress influence of such various types of external magnetic noise, a magnetic shield arranged around the magnetic sensor can be assumed to shield the sensor from the external magnetic noise. However, such a shielding configuration raises, if actually done, the number of parts and makes a torque detecting apparatus complex in its structure. Another drawback is also supposed such that the number of manufacturing steps is also obliged to increase.

With consideration of the forgoing drawbacks about the shielding structure, the torque detecting apparatus 10 according to the present embodiment adopts the magnetic yokes 12 magnetically covers the magnetic sensor 13. That is, the magnetic yokes 12 also serves as a shielding member which suppresses the external noise from magnetically influencing the magnetic sensor 13. In the following, the configuration of the magnetic yokes 12 and the arrangement of the magnetic sensor 12 will be detailed.

Figure 4:
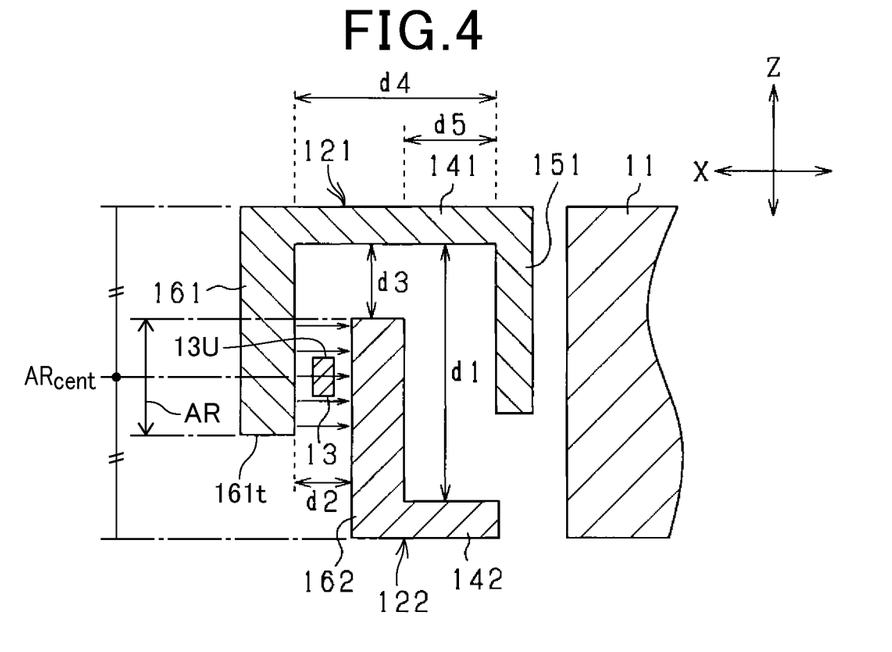
FIG. 4 is a partial sectional view sectioned to show an end face of the torque detecting apparatus.

As shown in FIGS. 3A to 3C, the annular bodies 141 and 142 have inner diameters which are larger than the outer diameter of the magnet 11, thus making the annular bodies 141 and 142 spatially separate from the magnet, thus realizing a non-contact arrangement therebetween. As shown in FIG. 4, the first magnetic yoke 121 has the annular body 141 whose outer diameter is set to be larger than the outer diameter of the annular body 142 of the second magnetic yoke 122 in the radial direction X. Meanwhile, both the annular bodies 141 and 142 of the first and second magnetic yokes 121 and 122 are configured to have the same inner diameter. FIG. 4 shows a section of a portion taken along an A-A cutting line shown in FIG. 3B.

As shown in FIG. 4, when seeing the portion sectioned along the A-A line shown in FIG. 3B, each of the annular bodies 141 and 142 is formed to be a thin plate portion extending along a plane direction perpendicular to the axial direction Z. The annular body 141 of the first magnetic yoke 121 is leveled to one end of the magnet 11, which end is positioned next to the input shaft 41, in the axial direction Z. On the other hand, the annular body 142 of the second magnetic yoke 122 is leveled to one end of the magnet 11, which end is positioned next to the output shaft 43, in the axial direction Z. According to this configuration, a distance d1 between both the annular bodies 141 and 142 is approximately the same as a height of the magnet 11 in the axial direction Z.

As shown in FIGS. 1 and 4, the claw portions 151 of the first magnetic yoke 121, which are integral with the annular body 121, are configured to build up from the annular body 141 in the axial direction Z and extend towards the second magnetic yoke 122. Similarly, the claw portions 152 of the first magnetic yoke 122, which are integral with the annular body 142, are configured to build up from the annular body 122 in the axial direction Z and extend towards the first magnetic yoke 121. The claw portions 151 and 152 are built up from the annular bodies 141 and 142, respectively, perpendicularly therefrom, and the respective claw portions 151 and 152 are shaped to have a top narrower in the circumferential width than its root portion. In addition, the claw portions 151 and 152 are positioned to be distanced from the outer surface of the magnet 11 in the radial direction X.

As shown in FIGS. 3A to 3C, the claw portions 151 of the first magnetic yoke 121 are positioned at an interval of 45 degrees along the inner edge of the annular body 141 in the circumferential direction Y. this positioning is true of the claw portions 152 of the second magnetic yoke 122. The first and second magnetic yokes 121 and 122 are positioned in a harmonized manner such that their claw portions 151 and 152 are alternately, yoke by yoke, at an interval of 22.5 degrees and aligned to have a space between two mutually-adjacent claw portions 151 and 152 (i.e., no contact between two claw portions 151 and 152) in the circumferential direction Y. Further, the claw portions 151 (152) of one of the first and second magnetic yokes 121 and 122 has no contact with the other of the first and second magnetic yokes 121 and 122.

As typically shown in FIG. 4, the wall portion 161 of the first magnetic yoke 121 and the wall portion 162 of the second magnetic yoke 122 are also separated from each other in the radial direction X. To be specific, the wall portion 161 of the first magenta yoke 121 are formed to extend toward the second magnetic yoke 122 from the outer edge of the annular body 131 of the first magnetic yoke in the axial direction Z. The wall portion 161 is perpendicular to the annular body 141. As shown by a dashed line in FIG. 3B, the wall portion 161 of the first magnetic yoke 121 is formed as a ring-shaped part which is continuous along the whole circumference of the annular body 141.

In addition, although not shown, the space formed between the wall portions 161 and 162 is filled with resin material so as to fixedly contain the magnetic sensor 35.

Meanwhile, as shown in FIG. 4, the wall portion 162 of the second magnetic yoke 122 is formed to extend towards the first magnetic yoke 121 from the outer edge of the annular body 142 of the second magnetic yoke 122 in the axial direction Z. In this second magnetic yoke 122, the wall portion 162 has an end which is separated from the first magnetic yoke 121 and is perpendicular to the annular body 142. To be specific, the wall portion 161 of the first magnetic yoke 121 and the wall portion 162 of the second magnetic yoke 122 are parallel with each other, which are located along the axial direction Z. As shown by chain lines in FIG. 3B, the wall portion 162 of the second magnetic yoke 162 is formed as a ring-shaped part which is continuous along the whole circumference of the annular body 142.

The wall portions 161 and 162 of the first and second magnetic yokes 121 and 122 have, every wall portion, axial lengths whose axial positional ranges are shifted from each other in the axial direction Z. In the present embodiment, a shifted amount is set to be longer half a distance d1 between the annular bodies 141 and 142 and also to be shorter than the distance d1 (refer to FIG. 4). This shifted amount makes it possible that the wall portions 161 and 162 are overlapped at, at least, an axial center of both the magnetic yokes 12 in the axial direction Z (that is, the wall portions 161 and 162 are positionally shifted in the axial direction Z, with their axial parts overlapped partially in the radial direction X, but separated with each other in the radial direction X).

Moreover, in the radial direction X, as shown in FIG. 4, there is formed a distance d2 between the wall portions 161 and 162 of the first and second magnetic yokes 121 and 122. This radial distance d2 is set to be the shortest among all other separated distances measured between the first and second magnetic yokes 121 and 122.

Practically, the distance d2 is provided to be shorter a distance d3 taken between a top end of the wall portion 162 of the second magnetic yoke 122 and the annular body 141 of the first magnetic yoke 121 in the axial direction Z. In addition, the distance d2 is set to be shorter than a distance d4 from the wall portion 161 of the first magnetic yoke 121 to the claw portions 151 and 152 in the axial direction Z. Further, the distance d2 is also set to be shorter than the distance d5 from the wall portion 162 of the second magnetic yoke 122 to the claw portions 151 and 152 in the radial direction X. The distance d2 is also set to be shorter than a distance between mutually-adjacent claw portions 151 and 152 in the circumferential direction Y.

Hence, when the positions of the magnetic yokes 12 displace relatively to the magnet 11 in the circumferential direction Y, there occur changes in density of magnetic fluxes between the wall portions 161 and 162 of the first and second magnetic yokes 121 and 122 in the circumferential direction Y. Namely, the magnetic fluxes can be prevented from leaking from portions other than the wall portions 161 and 162 of the magnetic yokes 12.

The magnetic sensor 13 is arranged to be located between the wall portions 161 and 162 of the first and second magnetic yokes 121 and 122 in the radial direction X. Precisely, the wall portion 161 of the first magnetic yoke 121 and the wall portion 162 of the second magnetic yoke 122 are opposed to each other with the magnetic sensor 13 disposed therebetween. The magnetic sensor 13 is disposed to sense a density of magnetic fluxes whose components are generated along the radial direction X, i.e., a density of the magnetic fluxes generated between the wall portions 161 and 162 of the first and second magnetic yokes 121 and 122 in the radial direction X. As shown in FIG. 4, from a detailed viewpoint, the magnetic sensor 13 is positioned between the wall portion 161 and the claw portion 151 of the first magnetic yoke 121 in the radial direction X and is also positioned outside of the wall portion 161 of the second magnetic yoke 122 in the radial direction X. Hence, the annular body 141 of the first magnetic yoke 121 contains, at least, the position of the magnetic sensor 13 in the radial direction X.

It is possible that the magnetic sensor 13 is arranged in a radical range from an end of the wall portion 161 of the first magnetic yoke 121 to an end of the wall portion 162 of the second magnetic yoke 122. That is, the magnetic sensor 13 can be positioned in an axial range where the wall portions 161 and 162 are overlapped (i.e., in an axial range AR in which the wall portions 161 and 162 are positionally shifted in the axial direction Z: refer to FIG. 4). By way of example, the magnetic sensor 13 is positioned at an axial center $AR_{cent}$ between the annular bodies 141 and 142 in the axial direction Z. It can also be understood that the magnetic sensor 13 is arranged between the wall portions 161 and 162 protruded from the upper and lower axial sides and positioned alternately in the radial direction X.

In this way, both axial sides of the magnetic sensor face with both of the wall portions 161 and 162, respectively. Since the wall portions 161 and 162 circle along all the radially-outer peripherals of the annular bodies 141 and 142 respectively, the magnetic sensor 13 is covered by the wall portions 161 and 162 in all directions perpendicular to the axial direction Z (for example, in directions perpendicular to the axial and radial directions). Moreover, the magnetic sensor 13 has a side which is faced to the annular body 141 of the first magnetic yoke 121 in the axial direction Z.

Operations and advantages gained by the foregoing structure will now be described.

Both the radial sides of the magnetic sensor 13 are faced to (i.e., covered by) the wall portions 161 and 162, so that radially-impinging external noise is magnetically shielded (absorbed) by the wall portions 161 and 162. Hence, magnetic flux, sensed by the magnetic sensor 13, is avoided from being influenced directly by such radially-impinging external noise. Furthermore, the axial one side 13U (refer to FIG. 4) of the magnetic sensor 13 is covered by (i.e., faced to) the annular body 141 of the first magnetic yoke 121, whereby external magnetic noise impinging from the first magnetic yoke side in the axial direction Z is magnetically shielded by the annular body 141. Hence, this makes it possible to prevent direct influence of such axially-impinging external noise on the sensing actions of the magnetic sensor 13.

The wall portions 161 and 162 are separated from each other in the radial direction X and the one of the wall portions 161 and 162 of the first and second magnetic yokes 121 and 122 is formed to extend toward the other magnetic yoke. Hence, the wall portions 161 and 162 can be provided to the magnetic yokes in an easier manner. By way of example, bending a metal plate using press working or any other process easily provides the magnetic yokes with the wall portions 161 and 162. Another working process is to weld the wall portions 161 and 162 along the outer edges of the annular bodies 141 and 142 respectively, thereby also easily providing arrangement of the wall portions 161 and 162. In addition, the magnetic yokes 12 can be assembled by covering the first magnetic yoke 121 onto the second magnetic yoke 122 in the axial direction Z. When comparing with a case in which there are no wall portions corresponding to the wall portions 161 and 162 according to the present embodiment, labor hours for the assembly are nearly unchanged from the conventional. From the foregoing various structural significances, the torque detecting apparatus 10 can be provided with a simpler configuration.

Since the wall portions 161 and 162 are parallel with each other, the magnetic sensor 13 is able to sense magnetic fluxes with higher degrees of accuracy, even if the magnetic sensor 13 is arranged at a shifted position in the axial direction Z. Hence, this makes it easier to assemble the torque detecting apparatus 10.

Further, the wall portions 161 and 162 are built to continue along all the circumferential peripheries of the annular bodies 141 and 142 respectively. Because of this construction, the magnetic sensor 13 is covered by the walls 161 and 162 also in directions perpendicular to the axial direction Z (for example, such directions including directional components perpendicular to the radial direction X). It is thus possible that external magnetic noise impinging along all directions perpendicular to the axial direction Z is magnetically shielded by the wall portions 161 and 162, thus suppressing influence of such external noise on magnetic fluxes which should be sensed by the magnetic sensor 13.

Furthermore, as shown in FIG. 4, in the axial direction Z, the magnetic sensor 13 is positioned closer to the annular body 141 than the tip $161_t$ of the wall portion 161 is. Hence, compared with a case where the magnetic sensor 13 is arranged at the tip $161_t$ or thereabouts, influence of external magnetic noise can be suppressed more effectively.

Second Embodiment

Figure 5:
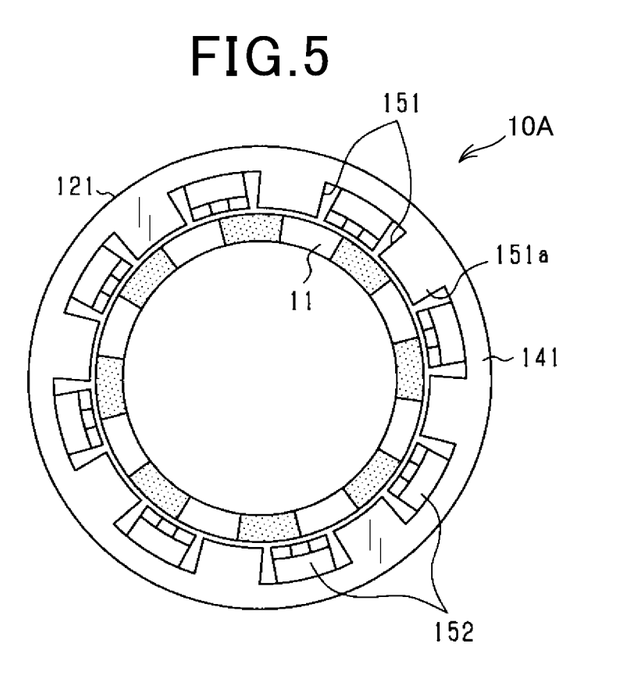
FIG. 5 is a plan view showing a torque detecting apparatus according to a second embodiment.
Figure 6:
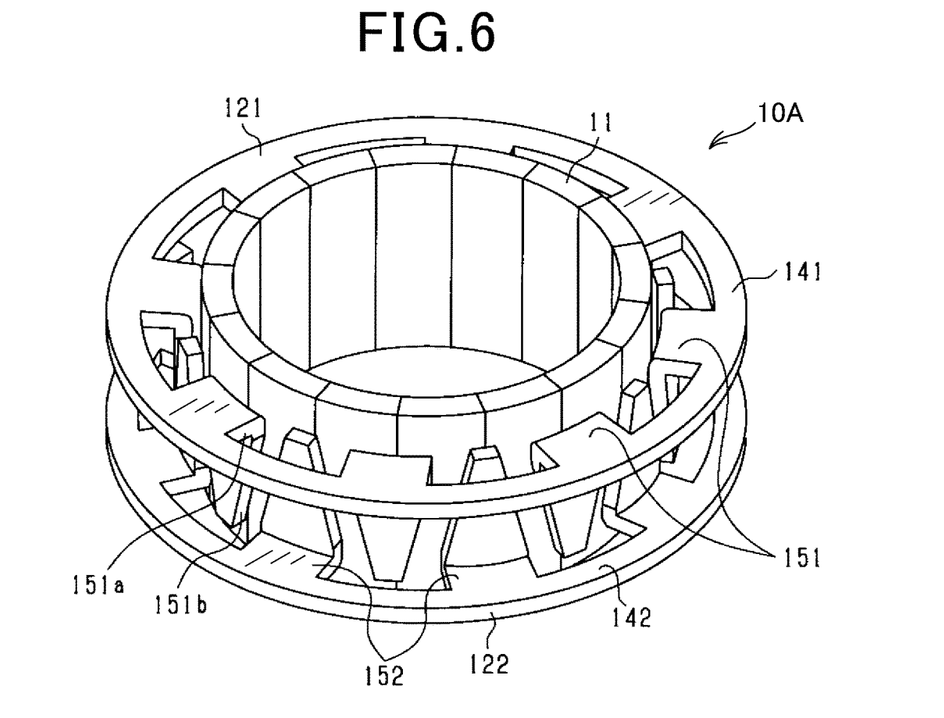
FIG. 6 is a perspective view showing the torque detecting apparatus according to the second embodiment.
Figure 7:
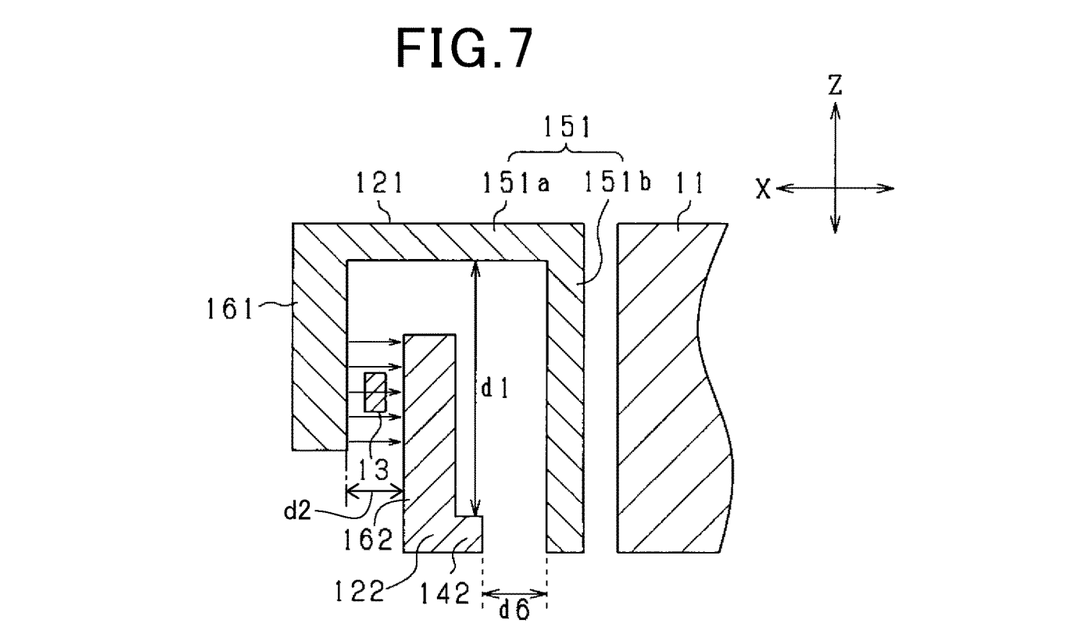
FIG. 7 is a partial sectional view sectioned to show an end face of the torque detecting apparatus according to the second embodiment.

Referring to FIGS. 5 to 7, a torque detecting apparatus according to a second embodiment will now be described.

For the sake of avoiding redundant explanations, in the second embodiment, components identical or functionally similar components explained in the first embodiment are given the same reference numbers. In the torque detecting apparatus 10A according to the second embodiment, the claw portions 151 and 152 are altered in their shapes. In FIG. 5, due to a simplified explanation, the wall portions 161 and 162 are omitted from being drawn.

As shown in FIG. 5, the first magnetic yoke 121 has the claw portions 151 which extend towards radially inward (towards the magnet 11) from the radial edge of the annular body 141. The extended claw portions 151 are then bent to be extended towards the magnetic yoke 122 in the axial direction Z, as shown in FIGS. 6 and 7. Specifically, each of the claw portions 151 has an extending portion 151a which extends from each circumferential part of the radially inner edge of the annular body 141 inwardly in the radial direction X and an opposing portion 151b which extends from the extending portion 151a so as to be opposed to the magnet 11 in the axial direction Z.

As illustrated in FIGS. 5 and 6, each of the extending portions 151a has a length in the radial direction X, in which the length is shorter than a distance from the radially inner edge of the annular body 141 to the magnet 11. The claw portions 151 are thus bent before the magnet 11.

As shown in FIGS. 6 and 7, the opposing portions 151b are formed to extend from the radially inner and of the extending portions 151a towards the second magnetic yoke 122 in the axial direction Z. The length of each of the opposing portions 151b (i.e., the claw portions 151) in the axial direction Z is set to be longer than the distance d1 provided between the annular bodies 141 and 142, which makes it larger the size of an area opposed to the magnet 11. This construction is true of the claw portions 152 of the second magnetic yoke 122.

As shown in FIG. 5, the claw portions 151 are arranged at an interval of 45 degrees along the annular body 141 in the circumferential direction Y, in the similar way to that in the first embodiment. The claw portions 152 of the second magnetic yoke 122 are also configured similarly to those of the first magnetic yoke 121. As a whole, the claw portions 151 and 152 of the first and second magnetic yokes 121 and 122 are alterably, yoke by yoke, arranged at a circumferential interval of 22.5 degrees. Hence, as shown in FIGS. 5 and 6, there is provided a special gap between mutually-adjacent claw portions 151 and 152 to avoid their mutual contact in the circumferential direction Y. In addition, as shown in FIG. 7, there is provided a space between each of the claw portions 151 and 152 and the counterpart magnetic yoke 12 to avoid their mutual contact.

Furthermore, in the radial direction X, a distance d6 between the respective claw portions 51 of the annular body 141 and the radial inner end of the annular body 142 is set to be longer than the distance d2 between the wall portions 161 and 162 of the first and second magnetic yokes 121 and 122. Similarly, although not shown in FIG. 6, there is provided the distance d6 between the claw portions 152 and the radial inner end of the annular body 141 and this distance d6 is set to be longer than the distance d2. A circumferential distance between mutually-adjacent claw portions 151 and 152 is also longer than the distance d2.

When the magnetic yokes 12 displace relatively to the magnet 11 in the circumferential direction Y, there are generated magnetic fluxes between the wall portions 161 and 162 of the first and second magnetic yokes 121 and 122 in the radial direction X, so that the generated magnetic fluxes can be sensed by the magnetic sensor 13. Hence, it is possible to prevent or suppress magnetic fluxes from portions other than the wall portions 161 and 162 of the magnetic yokes 12.

Besides the advantages provided in the first embodiment, the foregoing configuration is advantageous as follows.

The axial lengths of the claw portions 151 and 152 are longer than the distance d1 provided between the annular bodies 141 and 142. Hence, compared with a case in which such axial lengths are shorter than the distance d1, the claw portions 151 and 152 can have larger areas opposed to the magnet 11. It is thus possible to make it larger a density of magnetic fluxes generated between the wall portions 161 and 162, whereby the magnetic fluxes can be sensed more reliably and precisely.

OTHER EMBODIMENTS

The present invention cannot always be limited to the embodiments described above, but can be modified in various other modes. In the following embodiments, for the sake of a simplified description, the components which are the same or similar as or to those described in the foregoing embodiments are given the same reference numerals.

Figure 8:
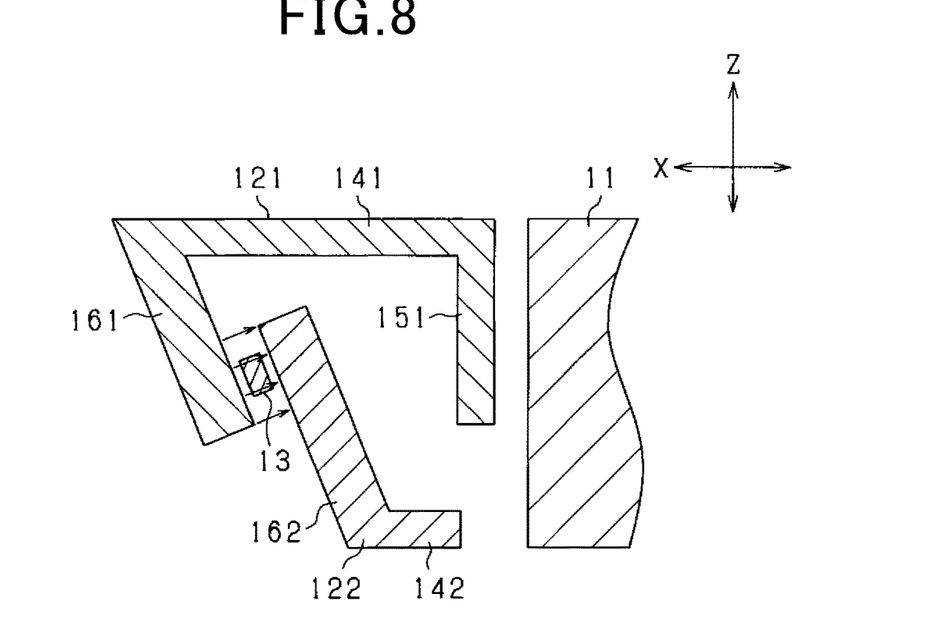
FIG. 8 is a partial sectional view sectioned to show an end face of a torque detecting apparatus according to an example.
Figure 9:
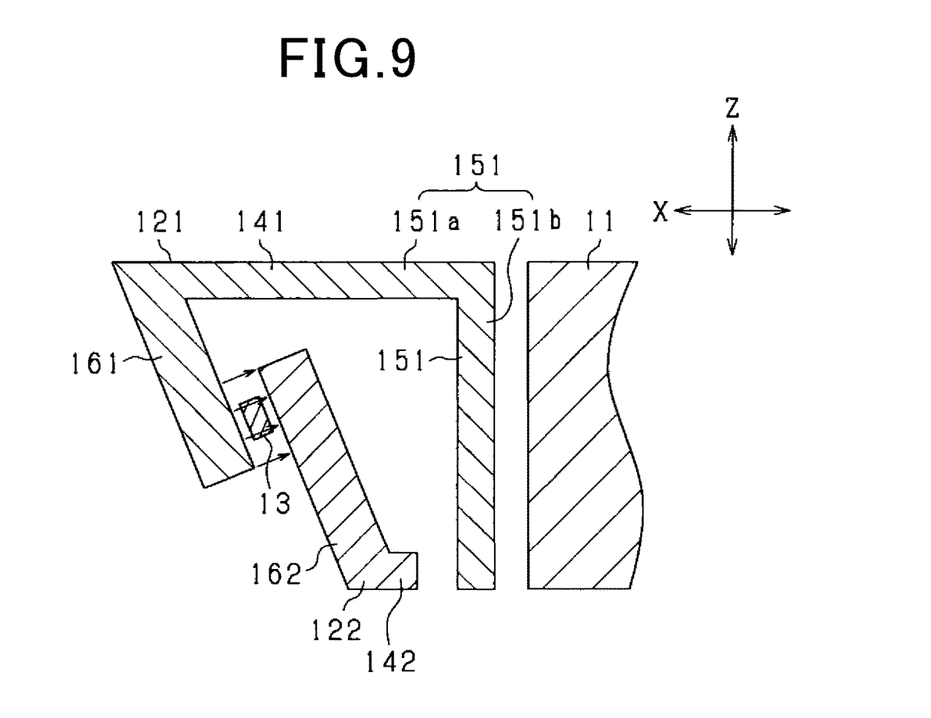
FIG. 9 is a partial sectional view sectioned to show an end face of a torque detecting apparatus according to another example.

A first modification is an angle of the wall portions to the annular bodies 141 and 142. In the foregoing embodiments, this angle is 90 degrees or thereabouts, but this angel can be changed, as shown in FIGS. 8 and 9, such that the wall portions 161 and 162 can be oblique (i.e., less than 90 degrees) to the annular bodies 141 and 142, respectively. In this modification, it is preferred that the wall portion 161, which is positioned radially outside, covers the length of the magnetic sensor 13 in the axial direction Z. This axial coverage configuration covers a lower side of the magnetic sensor 13, which lower side is opposed to the output shaft 43. This makes it possible to prevent or lower influence of external magnetic noise coming from the output shaft side.

Another modification relates to a position of the wall portion 161 at the first magnetic yoke 121. The wall portion 161 is not limited to be arranged at the radially outermost end of the first magnetic yoke 121, but may be at any positions of the first magnetic yoke 121 as long as the wall portion 161 is positioned radially outer than the magnetic sensor 13.

Another modification is about the other wall portion 162. Similar to the foregoing, the wall portion 162 is not limited to be arranged at the radially outermost end of the second magnetic yoke 122, but may be at any position within a radial range which is radially inside than the magnetic sensor 13 is.

As another modification, the annular bodies 141 and 142 can be arranged obliquely to the axial direction Z.

Figure 10:
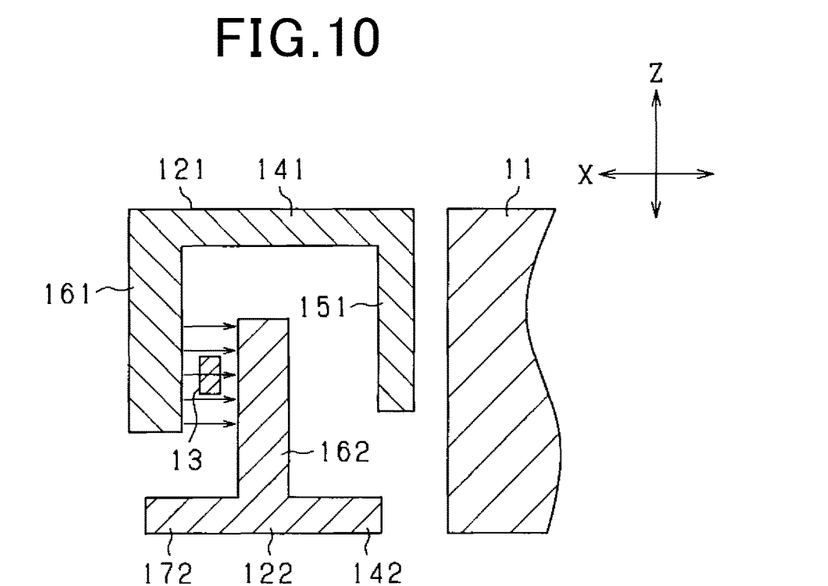
FIG. 10 is a partial sectional view sectioned to show an end face of a torque detecting apparatus according to another example.

Another modification is shown in FIG. 10, in which a protrusion 172 is fixedly arranged at the second magnetic yoke 122 such that the protrusion 172 protrudes radially outward from the wall portion 162 of the second magnetic yoke 122. It is preferred that, when viewed in the section shown in FIG. 9, the protrusion 172 is positioned closer to the output shaft 43 than the end of the wall portion 161 is, in the axial direction Z. It is also preferred that the end of the protrusion 172 reaches a radial position beyond the magnetic sensor 13, which can cover the magnetic sensor 13 in the radial direction X, as shown in FIG. 10. Namely it is preferred that the protrusion 172 is positioned to be opposed to an opening provided between both the wall portions 161 and 162. Therefore, external magnetic noise can be prevented or suppressed from impinging to the magnetic sensor 13 from the outer shaft side in the axial direction Z.

Figure 11:
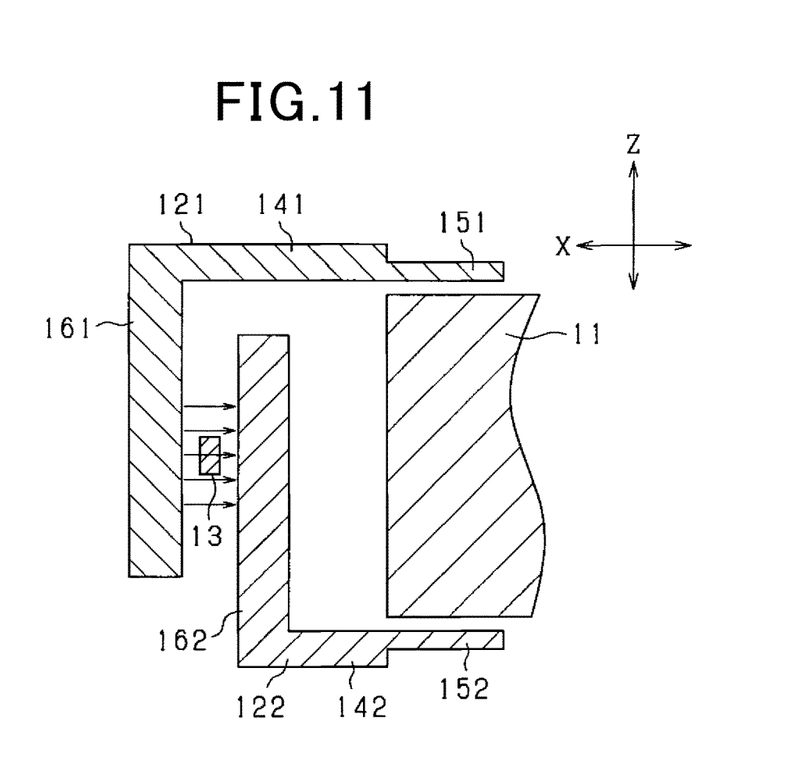
FIG. 11 is a partial sectional view sectioned to show an end face of a torque detecting apparatus according to another example.

By way of example, the directions of magnetization at the magnet 11 can be changed, so that shapes of the claw portions 151 and 152 can be changed arbitrarily depending on the magnetization directions. For example, as shown in FIG. 11, when the magnet is given magnetization performed in the axial direction, the claw portions 151 and 162 are allowed to extend from the yoke inner end toward the shaft center line. In this case, the claw portions of the first magnetic yoke 121 and the claw portions 152 of the second magnetic yoke 122 are arranged at the same positions in the circumferential direction Y.

A magnetic shield member, made of soft magnetic material, can be arranged to shield against external magnetic noise. For example, a ring-shaped magnetic shield member can be arranged at a radial position which is outside the wall portion 162 such that the space between the wall portions 161 and 162 is covered, that is, the magnetic sensor 13 is covered in the radial direction X. This enhances suppression of external magnetic noise impinging onto the magnetic sensor 13 from the outer shaft side in the axial direction Z.

There can be additionally provided a magnetic collecting member which collects magnetic fluxes from the first magnetic yoke 121 and a further magnetic collecting member which collects magnetic fluxes from the second magnetic yoke 122. Such collecting portions are made of soft magnetic material. For example, a ring-shaped magnetic collecting member can be arranged at a radial position shifted inward from the wall portion 161 of the first magnetic yoke 121. Similarly, a ring-shaped magnetic collecting member can be arranged at a radial position shifted outward from the wall portion 162 of the second magnetic yoke 122. In this case, the magnetic sensor 13 is located to sense magnetic fluxes generated between both the magnetic collecting members.

Moreover, the wall portions 161 and 162 are not limited to a case in which the wall portions 161 and 162 are arranged at the whole peripheral of the annular bodies 141 and 142, respectively. For example, the wall portions 161 and 162 are provided as arch-shaped wall portions when viewing from the top in the axial direction Z and arranged to allow the magnetic sensor 13 to still be present therebetween in the radial direction X.

As another modification, the wall portion 161 of the first magnetic yoke 121 can be extended farther than the annular body 142 of the second magnetic yoke 122 towards the output shaft 43 in the axial direction Z. It is thus possible that the wall portion 161 has a bent portion as its end portion and this bent portion magnetically covers the magnetic sensor 13 in the axial direction Z, thus suppressing influence of external magnetic noise coming from the output shaft side in the axial direction Z.

By way of another modification, the shapes of the first and second magnetic yokes 121 and 122 can be exchanged to each other. Specifically, the outer diameter of the annular body 142 of the second magnetic yoke 122 is set to be larger than the outer diameter of the annular body 141 of the first magnetic yoke 121 and the wall portion 162 of the second magnetic yoke 122 is positioned outside the wall portion 161 of the first magnetic yoke 121 in the radial direction X.

What is claimed is:

1. An apparatus for detecting torque, comprising:
   a first shaft;
   a second shaft;
   an elastic member coaxially linking the first and second shafts such that the first and second shafts are linked linearly with the elastic member therebetween and the elastic member provides a torsional displacement for detecting the torque, the linearly connected first and second shafts and elastic member having an axial direction along a length-wise direction of the first and second shafts, a radial direction perpendicular to the axial direction, and a circumferential direction around the first and second shafts;
   a magnet attached to the first shaft;
   a pair of magnetic yokes composed of a first magnetic yoke and a second magnetic yoke, the first and second magnetic yokes being fixedly installed on the second shaft, the first and second magnetic yokes being separated from each other in the axial direction; and
   a magnetic sensor detecting magnetic flux generated between the first and second magnetic yokes,
   wherein each of the first and second magnetic yokes comprises:
     an opposing portion, the opposing portion being positioned to be opposed to the magnet and displaced relatively to the magnet in the circumferential direction when the elastic member is subjected to a torsional displacement; and
     a wall portion, the wall portion of each of the first and second magnetic yokes being separated in the radial direction and positioned outside the opposing portion in the radial direction, the wall portion of one of the first and second magnetic yokes extending towards the wall portion of the other of the first and second magnetic yokes, the magnetic sensor being positioned between the wall portions of the first and second magnetic yokes in the radial direction.

2. The apparatus of claim 1, wherein
   the wall portion of each first and second magnetic yokes are parallel with each other, and
   the magnetic sensor is configured to detect the magnetic flux generated between the wall portion of the first and second magnetic yokes.

3. The apparatus of claim 2, wherein
   the magnet has a radial outer surface in the radial direction;
   the first and second magnetic yokes are formed to have annular bodies which encircle the radial outer surface of the magnet, each first and second magnetic yoke having and have both the opposing portion and the wall portion; and
   each wall portion is formed to be continuous along whole circumferences of the annular bodies.

4. The apparatus of claim 3, wherein
   the wall portion of the first and second magnetic yokes includes one wall portion located outside the other wall portion in the radial direction;
   the one wall portion is positionally overlapped with the magnetic sensor in the radial direction and located to be oblique to the axial direction so as to avoid the magnetic sensor from being positionally overlapped in the radial direction.

5. The apparatus of claim 4, wherein
   the wall portion of the first and second magnetic yokes includes one wall portion located inside the other wall portion in the radial direction;
   the one wall portion having a protruding portion protruding outward in the radial direction; and
   the protruding portion protruding so as to be positionally overlapped with the magnetic sensor in the axial direction.

6. The apparatus of claim 1, wherein
   the magnet has a radial outer surface in the radial direction;
   the first and second magnetic yokes are formed to have annular bodies which encircle the radial outer surface of the magnet, each first and second magnetic yoke having both the opposing portion and the wall portion; and
   each wall portion is formed to be continuous along whole circumferences of the annular bodies.

7. The apparatus of claim 6, wherein
   the wall portion of the first and second magnetic yokes includes one wall portion located outside the other wall portion in the radial direction;
   the one wall portion is positionally overlapped with the magnetic sensor in the radial direction and located to be oblique to the axial direction so as to avoid the magnetic sensor from being positionally overlapped in the radial direction.

8. The apparatus of claim 7, wherein
   the wall portion of the first and second magnetic yokes includes one wall portion located inside the other wall portion in the radial direction;
   the one wall portion having a protruding portion protruding outward in the radial direction; and
   the protruding portion protruding so as to be positionally overlapped with the magnetic sensor in the axial direction.

9. The apparatus of claim 1, wherein
   the wall portion of the first and second magnetic yokes includes one wall portion located outside the other wall portion in the radial direction;
   the one wall portion is positionally overlapped with the magnetic sensor in the radial direction and located to be oblique to the axial direction so as to avoid the magnetic sensor from being positionally overlapped in the radial direction.

10. The apparatus of claim 9, wherein
    the wall portion of the first and second magnetic yokes includes one wall portion located inside the other wall portion in the radial direction;
    the one wall portion having a protruding portion protruding outward in the radial direction; and
    the protruding portion protruding so as to be positionally overlapped with the magnetic sensor in the axial direction.

11. The apparatus of claim 1, wherein
    the wall portion of the first and second magnetic yokes includes one wall portion located inside the other wall portion in the radial direction;
    the one wall portion having a protruding portion protruding outward in the radial direction; and
    the protruding portion protruding so as to be positionally overlapped with the magnetic sensor in the axial direction.

* * * * *